US011946624B1

(12) United States Patent
Jiang

(10) Patent No.: US 11,946,624 B1
(45) Date of Patent: Apr. 2, 2024

(54) STAGE LIGHT FIXTURE WITH INTEGRATED LENS HOLDER

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/361,182

(22) Filed: Jul. 28, 2023

(30) Foreign Application Priority Data

Jun. 27, 2023 (CN) ......................... 202321638953.1

(51) Int. Cl.
*F21V 21/14* (2006.01)

(52) U.S. Cl.
CPC .................................... *F21V 21/14* (2013.01)

(58) Field of Classification Search
CPC ....................................................... F21V 21/14
See application file for complete search history.

(56) References Cited

U.S. PATENT DOCUMENTS

| | | | | |
|---|---|---|---|---|
| 11,178,322 | B2 * | 11/2021 | Park | H04N 23/57 |
| 2006/0061877 | A1 * | 3/2006 | Yasui | G02B 7/02 359/699 |
| 2018/0338069 | A1 * | 11/2018 | Hu | H04N 23/55 |
| 2020/0072453 | A1 * | 3/2020 | Mittal | F21V 19/003 |
| 2020/0225442 | A1 * | 7/2020 | Weng | G02B 26/085 |
| 2022/0329734 | A1 * | 10/2022 | Kim | H02N 2/026 |

* cited by examiner

*Primary Examiner* — Christopher E Dunay
(74) *Attorney, Agent, or Firm* — MUNCY, GEISSLER, OLDS & LOWE, P.C.

(57) ABSTRACT

A stage light fixture with an integrated lens holder includes a light head having a light source and a light-outgoing lens assembly, light emitted from the light source being projected through the light-outgoing lens assembly; and a support arm for supporting the light head to rotate. The light head is provided with a lens mounting ring for fastening the light-outgoing lens assembly, a support plate having a light-passing hole, and a plurality of support pillars for connecting the lens mounting ring to the support plate, which are integrally form the lens holder in an integrated form to accommodate a focusing assembly and/or an amplifying assembly. Compared to the lens holder formed by splicing metal plates, such integrated structure can reduce parts for assembly and reduce geometric tolerance due to multiple process flow, thereby achieving improved assembly accuracy. Meanwhile, the integrated lens holder can strengthen the whole strength thereof.

14 Claims, 8 Drawing Sheets

STAGE LIGHT FIXTURE WITH INTEGRATED LENS HOLDER

CROSS REFERENCE TO RELATED APPLICATIONS

The present application claims priorities from Chinese Application No. CN 202321638953.1 filed on Jun. 27, 2023, all of which are hereby incorporated herein by reference.

TECHNICAL FIELD

The present invention relates to the technical field of stage light fixtures, and more particularly, relates to a stage light fixture with an integrated lens holder.

BACKGROUND

In the field of stage lighting, various stage light fixtures are often used to achieve stage effects required for the performance, such as the widely used moving head light fixtures. The existing stage light fixture generally includes a fixed case, a support arm arranged on the fixed case, and a light head support by the support arm. The light head of the light fixture has various holders for mounting different assemblies, in particular, such as a lens holder for mounting lens.

However, the existing lens holder of the stage light fixture is typically formed by splicing metal plates. Such configuration of the holder will have poor integral strength and become more prone to damage at the connection portion. In addition, the process of splicing metal plates is complex with a large number of parts, causing high size errors, thus resulting in that the key geometric tolerance of the holder cannot be guaranteed.

SUMMARY

It is the object of the present invention to provide an improved stage light fixture with an integrated holder, which is advantageous to simplify the mounting process of the stage light fixture, thus shortening the mounting time and meanwhile improving the assembly accuracy thereof.

The stage light fixture according to the present invention includes a light head having a light source and a light-outgoing lens assembly and a support arm for supporting the light head to rotate. The light emitted from the light source is projected through the light-outgoing lens assembly. The light head is provided with a lens mounting ring for fastening the light-outgoing lens assembly, a support plate having a light-passing hole, and a plurality of support pillars for connecting the lens mounting ring to the support plate. In the present invention, such lens mounting ring, support plate, and support pillars integrally form the lens holder to accommodate a focusing assembly and/or an amplifying assembly. The lens holder thus is in an integrated form in the present invention.

According to the present invention, the lens mounting ring, the support plate, and the support pillars are integrally designed. Compared to the lens holder formed by splicing metal plates, such integrated structure can reduce parts for assembly and further reduce geometric tolerance due to multiple process flow, thereby achieving improved assembly accuracy. Meanwhile, the lens holder in integrated form can strengthen the whole strength thereof.

In order to reduce the whole weight of the lens holder and achieve design for lightweighting, the amount of material of the support pillar can be reduced while with little influence on the strength thereof. For this, at least one of the support pillars is provided with a lightening hole at the end close to the lens mounting ring in the present invention.

Preferably, the cross section of at least one of the support pillars at the end close to the support plate is in L shape in a direction perpendicular to the direction of light outgoing. In such easy way, the support pillar has good strength property, which can avoid damage due to bending under force.

In a bid to fasten the light-outgoing lens assembly to the lens holder more conveniently and precisely, the lens mounting ring is provided with at least one first positioning pin for positioning the light-outgoing lens assembly during mounting. In particular, the first positioning pin is disposed at the outside of the light-outgoing lens assembly.

As casting method for integrated design is easy to operate while has high structure strength, the integrated lens holder in the present invention is preferably molded by casting.

In the present invention, the integrated lens holder may be detachably disposed with a first side plate and a second side plate which are respectively arranged at two opposite sides of the lens holder. With such configuration, the lens holder can be applicable for stage light fixture in different specification, only with replacing the first side plate and the second side plate in different specification, such as thickness, according to actual demands of the stage light fixture.

Particularly, both sides of the first side plate and/or the second side plate are respectively connected to one support pillar. For this, both sides of the first side plate and/or the second side plate are respectively provided with at least one second positioning pin, correspondingly the support pillar is provided with at least one second positioning hole assembled with the second positioning pin. Alternatively, both sides of the first side plate and/or the second side plate are respectively provided with at least one second positioning hole, correspondingly the support pillar is provided with at least one second positioning pin assembled with the second positioning hole. In such easy and convenient way, the first side plate and/or the second side plate can be prepositioned prior to being fastened to the corresponding support pillar.

More preferably, the support pillar is provided with a mounting shoulder at the connecting portion with the first side plate and/or the second side plate, and the second positioning pin or the second positioning hole are disposed in the mounting shoulder. With such configuration, the first side plate and the second side plate are limited by the mounting shoulder during mounting and are accurately fastened to the mounting shoulder through additional locking screws.

In order to further limit the first side plate and/or the second side plate during mounting, both sides of the first side plate and/or the second side plate are respectively provided with a depression, and the mounting shoulder is correspondingly disposed in the depression.

According to the present invention, the stage light fixture may further include an effect assembly holder for mounting at least one effect assembly, at the side of the lens holder away from the light-outgoing lens assembly. In particular, the effect assembly holder has two opposite side support plates, which are respectively disposed at the same side with the first side plate and the second side plate. In the present invention, the effect assembly can be supported by the effect assembly holder to switch in and out of the light path emitted by the light source.

The effect assembly holder may be directly pivoted with the support arm via a pivoting shaft according to the present invention, so that the support arm can support the light head to rotate around the pivoting shaft.

More preferably, according to the present invention, a motor mounting plate for mounting a drive motor may be disposed at the side of the first side plate away from the second side plate. Correspondingly, the first side plate is provided with an avoiding hole for avoiding the drive motor, such as receiving the drive motor or for the drive motor passing through. The motor mounting plate is also fastened to the support pillar. With such configuration, the light head can rotate around the axis of the pivoting shaft under driving of the drive motor.

To move the focusing assembly and/or the amplifying assembly up and down along the light path emitted from the light source, a slide rail is disposed at the side of the second side plate close to the first side plate, and a first drive motor and/or a second drive motor are disposed at the side of the second side plate away from the first side plate for respectively driving the focusing assembly and/or the amplifying assembly to move up and down along the slide rail. Therefore, it can achieve further varied light effects of the stage light fixture according to actual demands.

Particularly, the focusing assembly includes a focusing base plate and a focusing lens thereon, and a prism and/or frosting lens are further provided on the focusing base plate for switching in/out of the light path of the focusing lens, according to the present invention. The focusing lens is able to adjust the focal distance of the light beam emitted from the light source to make the light beam having clear effect regardless of the projected distance. The prism is configured to increase the amount of the light beam of the light source. The frosting lens is configured to produce hazy visual effects by the light beam of the light source.

DETAILED DESCRIPTION

Figure 1:
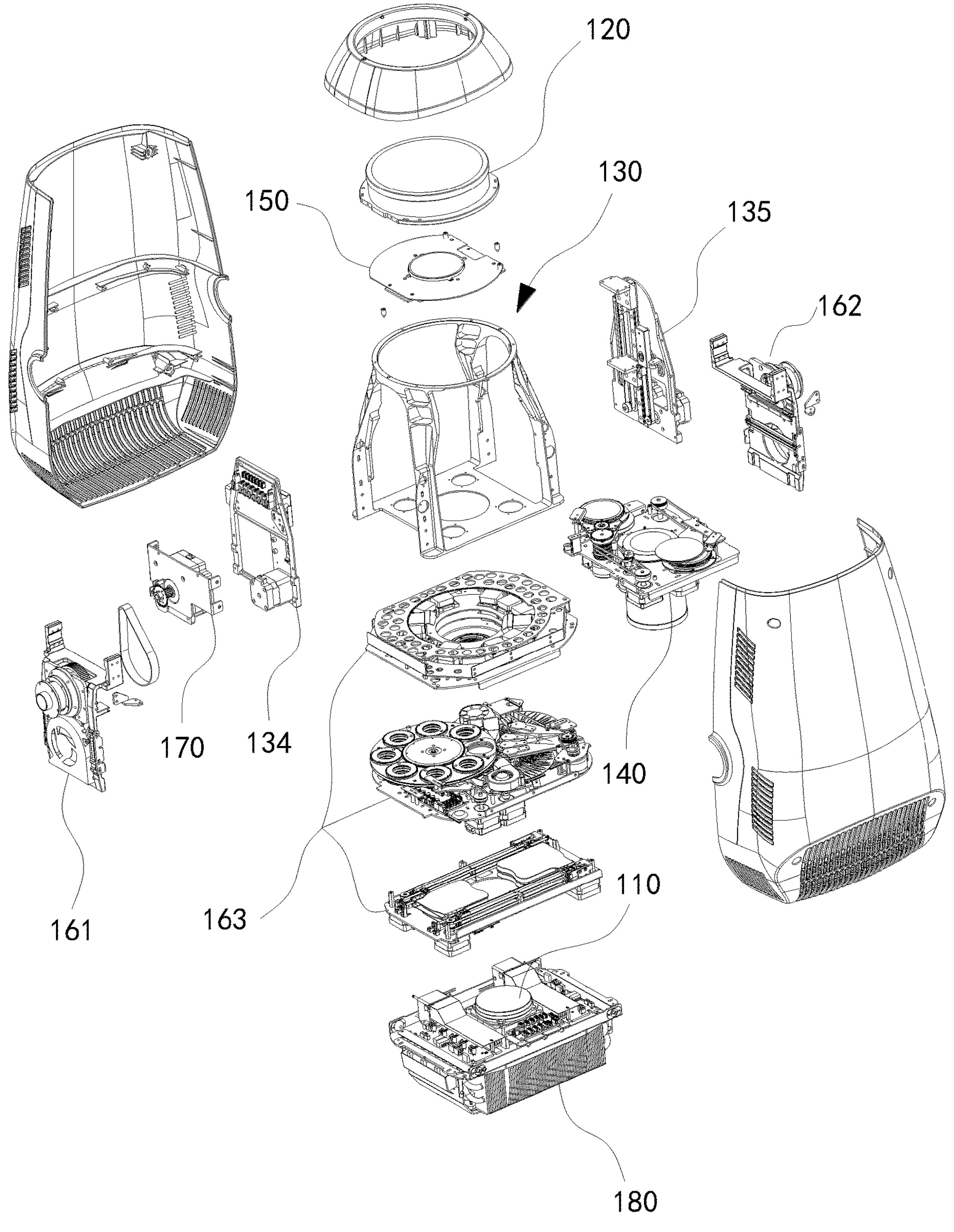
FIG. 1 is an exploded view of a light head according to an embodiment of the present invention.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

Figure 8:
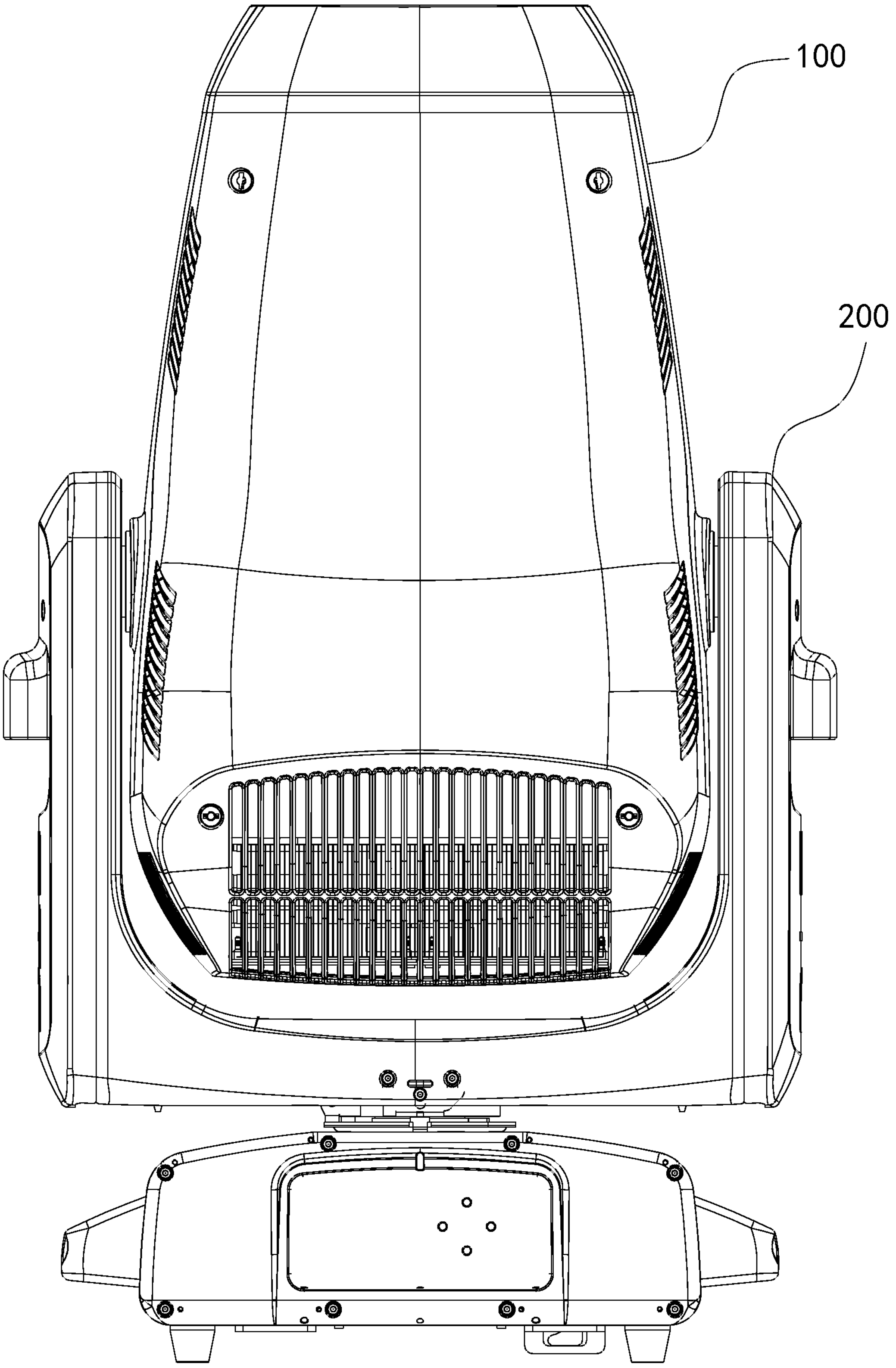
FIG. 8 is an overall structural view of a stage light fixture according to an embodiment of the present invention.

FIGS. 1 and 8 depict a stage light fixture with an integrated lens holder, which includes a light head 100 having a light source 110 and a light-outgoing lens assembly 120 and a support arm 200 for supporting the light head 100 to rotate. The light emitted from the light source 110 is projected through the light-outgoing lens assembly 120. In this embodiment, referring to FIG. 2, the light head 100 is provided with a lens mounting ring 131 for fastening the light-outgoing lens assembly 120, a support plate 132 having a light-passing hole 1321, and a plurality of support pillars 133 for connecting the lens mounting ring 131 to the support plate 132. Such lens mounting ring 131, support plate 132, and support pillars 133 integrally form the lens holder 130 to accommodate a focusing assembly 140 and/or an amplifying assembly 150. The lens holder 130 thus is in an integrated form.

In the present embodiment, the lens mounting ring 131, the support plate 132, and the support pillars 133 are integrally designed. Compared to the lens holder formed by splicing metal plates, such integrated structure can reduce parts for assembly and further reduce geometric tolerance due to multiple process flow. Furthermore, the lens holder 130 in integrated form is applicable for light heads in different specification, resulting in standardization and universalization of parts for assembly. Therefore, the standardized and universalized lens holder 130 has assembly reference for parts to achieve improved assembly accuracy and improved consistency of internal components in the stage light fixture. Meanwhile, the lens holder 130 in integrated form strengthens the whole strength thereof to have an improved service life of the light head 100.

Figure 2:
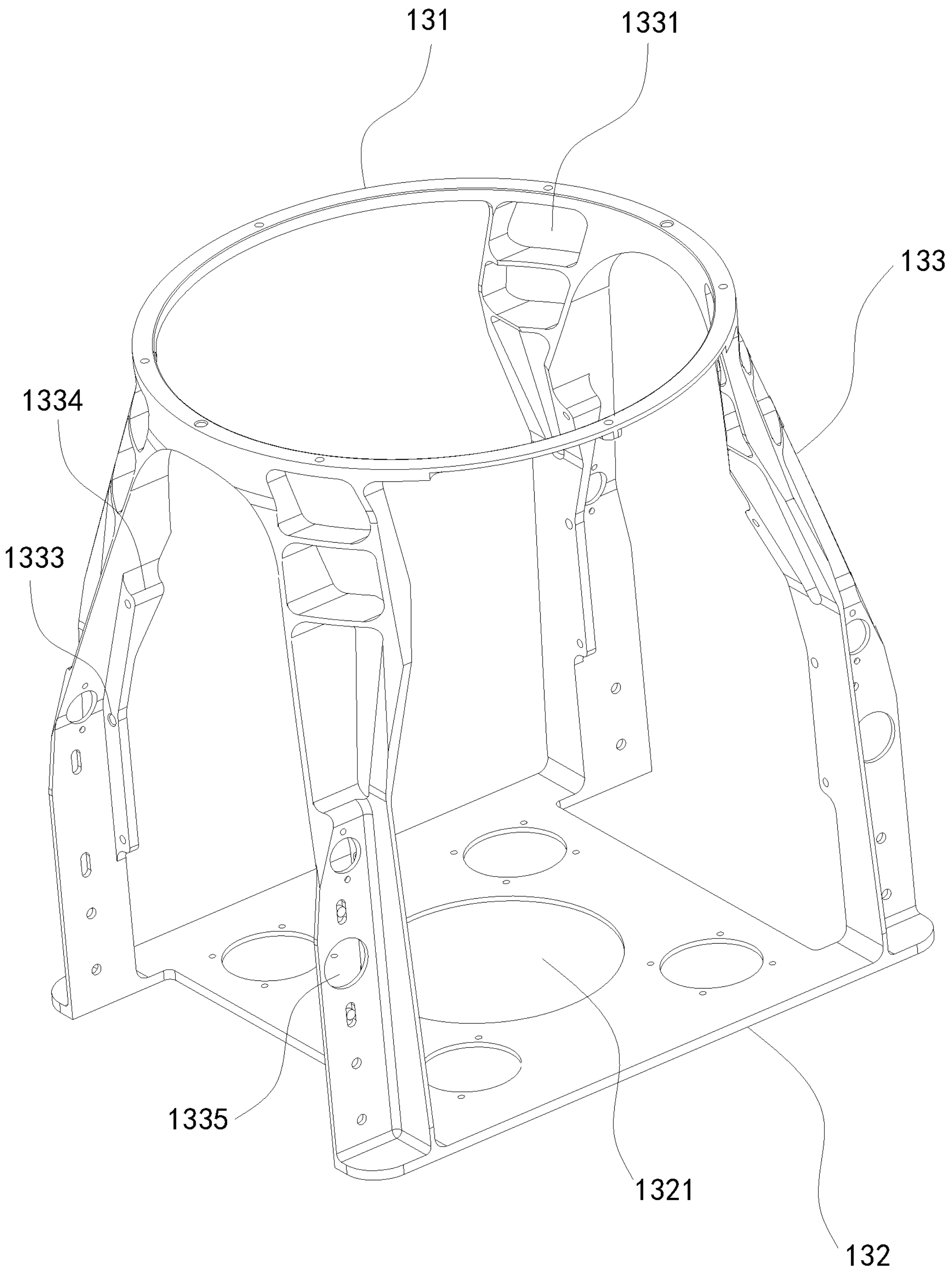
FIG. 2 is a structural view of a lens holder according to an embodiment of the present invention.

Preferably, four support pillars 133 in rectangle shaped distribution are disposed on the support plate 132, as FIG. 2 shown.

In a preferable embodiment of the present invention, each support pillar 133 is provided with a lightening hole 1331 at the end close to the lens mounting ring 131. Such configuration can reduce the amount of material with little influence on the strength of the support pillar 133, so that the whole weight thereof can be reduced, which is benefit for light-weighting.

Preferably, the lightening hole 1331 is disposed within the range of ½ length of the corresponding support pillar 133 at the end close to the lens mounting ring 131.

Each support pillar 133 is preferably further provided with a wire-passing hole 1335.

Preferably, as shown in FIG. 2, the cross section of each support pillar 133 at the end close to the support plate 132 is in L shape in a direction perpendicular to the direction of light outgoing. In such way, the support pillar 133 has good strength property, which can avoid damage due to bending under force.

The L-shaped cross section of each support pillar 133 is disposed within the range of ½ length of the corresponding support pillar 133 at the end close to the support plate 132.

However, in other embodiments, the cross section of each support pillar 133 at the end close to the support plate 132 may be in wave shape, arc shape, or polygonal lines with angle more than or less than 90 degrees, or the like, which is not exhaustive and limited here.

Figure 6:
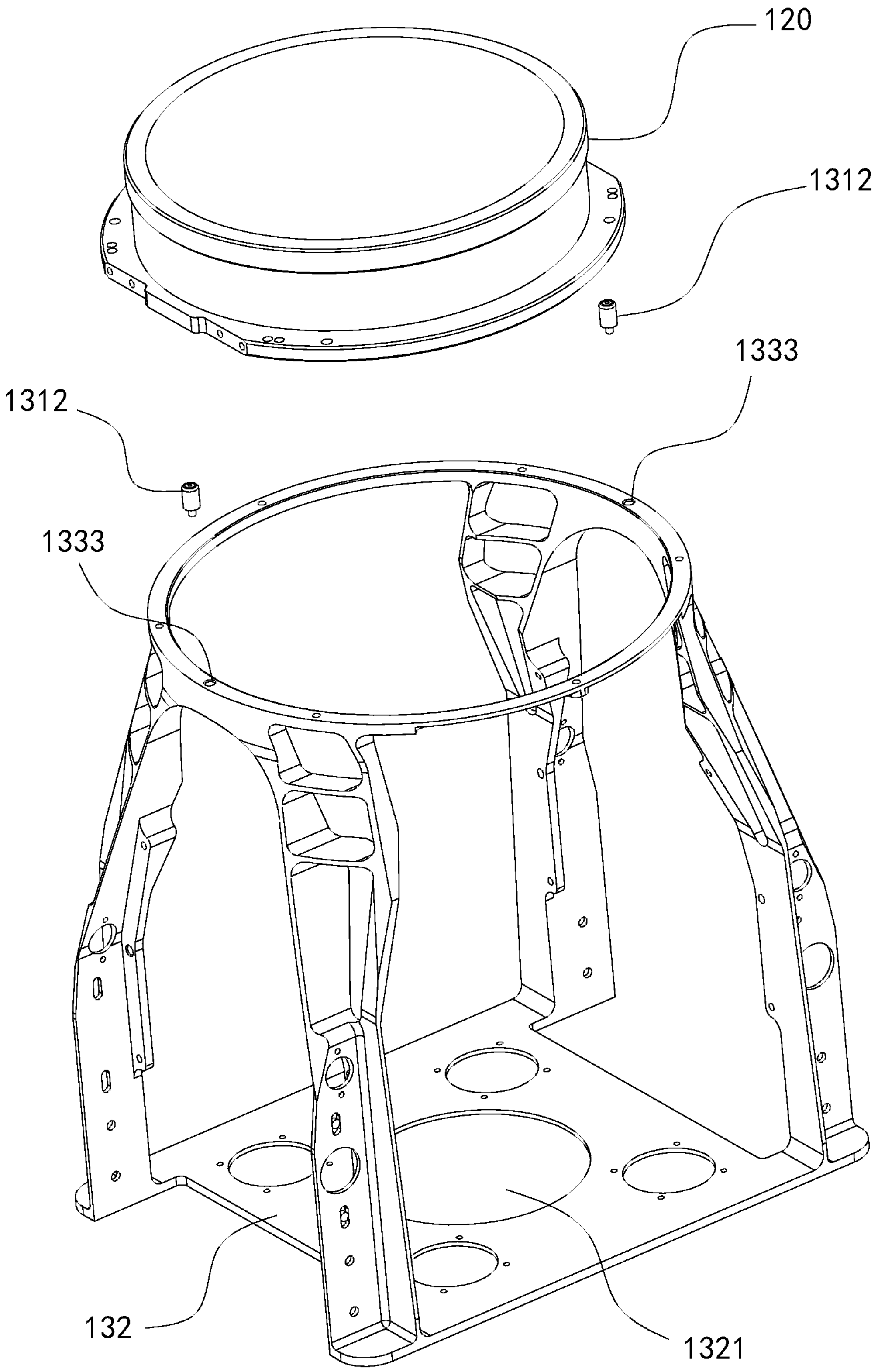
FIG. 6 is a structural view of a light-outgoing lens assembly and a lens holder according to an embodiment of the present invention.

With reference to FIG. 6, in a preferable embodiment of the present invention, the lens mounting ring 131 is provided with at least one first positioning pin 1312 for positioning the light-outgoing lens assembly 120, such first positioning pin 1312 is inserted the corresponding first positioning hole 1311 in the lens mounting ring 131. The first positioning pin 1312 is disposed at the outside of the light-outgoing lens assembly 120. In this embodiment, the light-outgoing lens assembly 120 is mounted and positioned by the first positioning pin 1312, making the light-outgoing lens assembly 120 accurately fastened to the lens holder 130 by locking screws. In such way, the light-outgoing lens assembly 120 can be fastened to the lens holder 130 more conveniently and precisely.

Preferably, several first positioning pins 1312 are provided, which are disposed at the two opposite sides of the lens holder 130, especially the several first positioning pins 1312 is limited the light-outgoing lens assembly 120 from the two parallel sides thereof.

In a preferable embodiment of the present invention, the integrated lens holder 130 is molded by casting. The casting method is easy while has high structure strength.

However, in other embodiments, the integrated lens holder 130 may also be formed by punch forming.

Referring back to FIG. 1, in a preferable embodiment of the present invention, the integrated lens holder 130 is detachably disposed with a first side plate 134 and a second side plate 135 which are respectively arranged at two opposite sides of the lens holder 130. In such configuration, only the first side plate 134 and the second side plate 135 with different thickness are required to replace according to the demanded distance between the first side plate 134 and the second side plate 135, the lens holder 130 thus can be applicable for stage light fixture in different specification.

Preferably, the first side plate 134 and the second side plate 135 are all in integrated form. In this case, the nuts assembled with the locking screws and the first/second side plate 134, 135 are respectively integrally formed, avoiding additional self-clinching nuts or bending nuts, thereby resulting in reduced processing flow, simplifying the assembly process and thus improving assembly efficiency.

Figure 5:
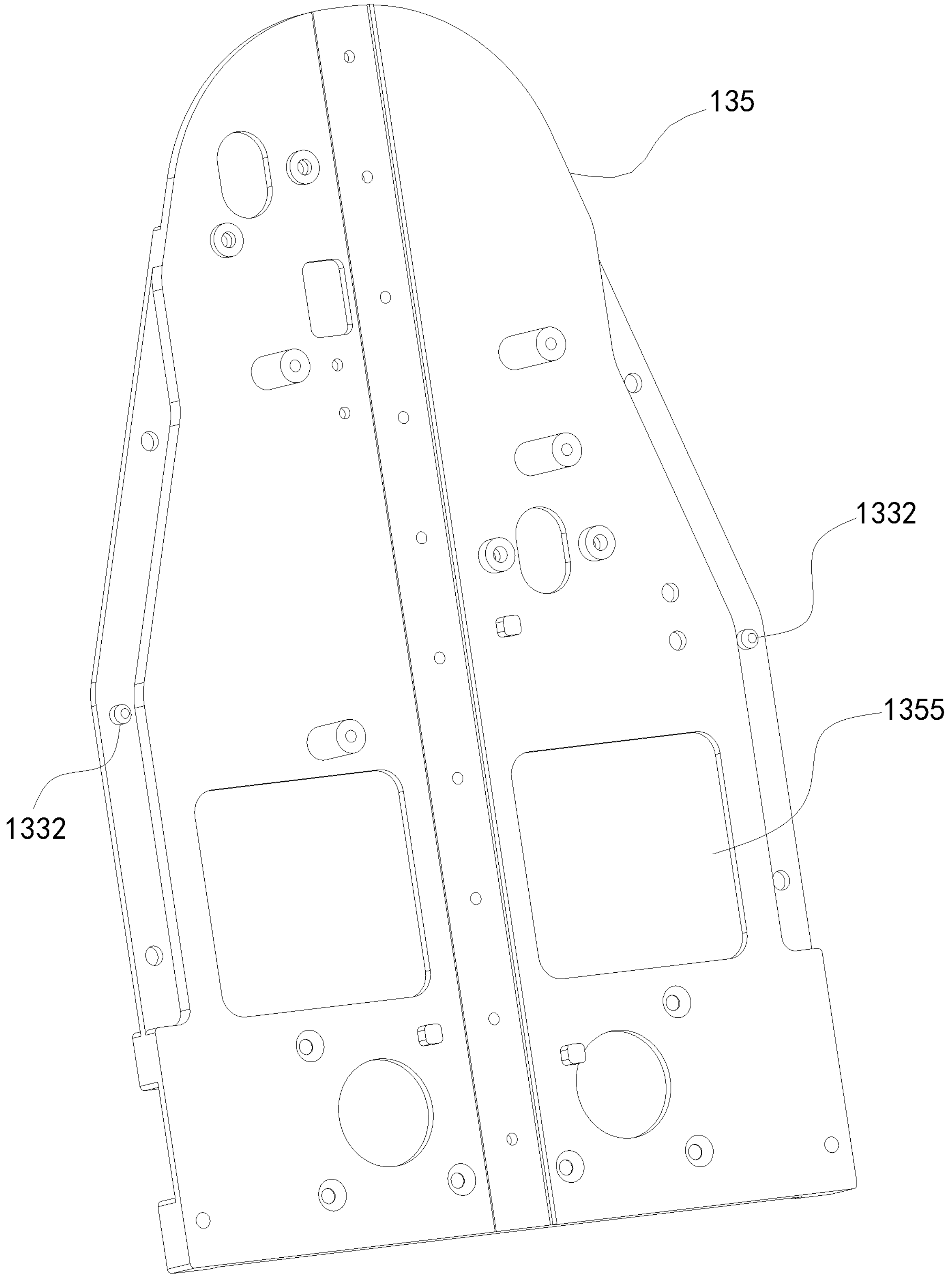
FIG. 5 is a structural view of a second side plate according to an embodiment of the present invention.

More preferably, as FIG. 5 shown, the first side plate 134 and/or the second side plate 135 is provided with a material saving hole 1355.

Figure 4:
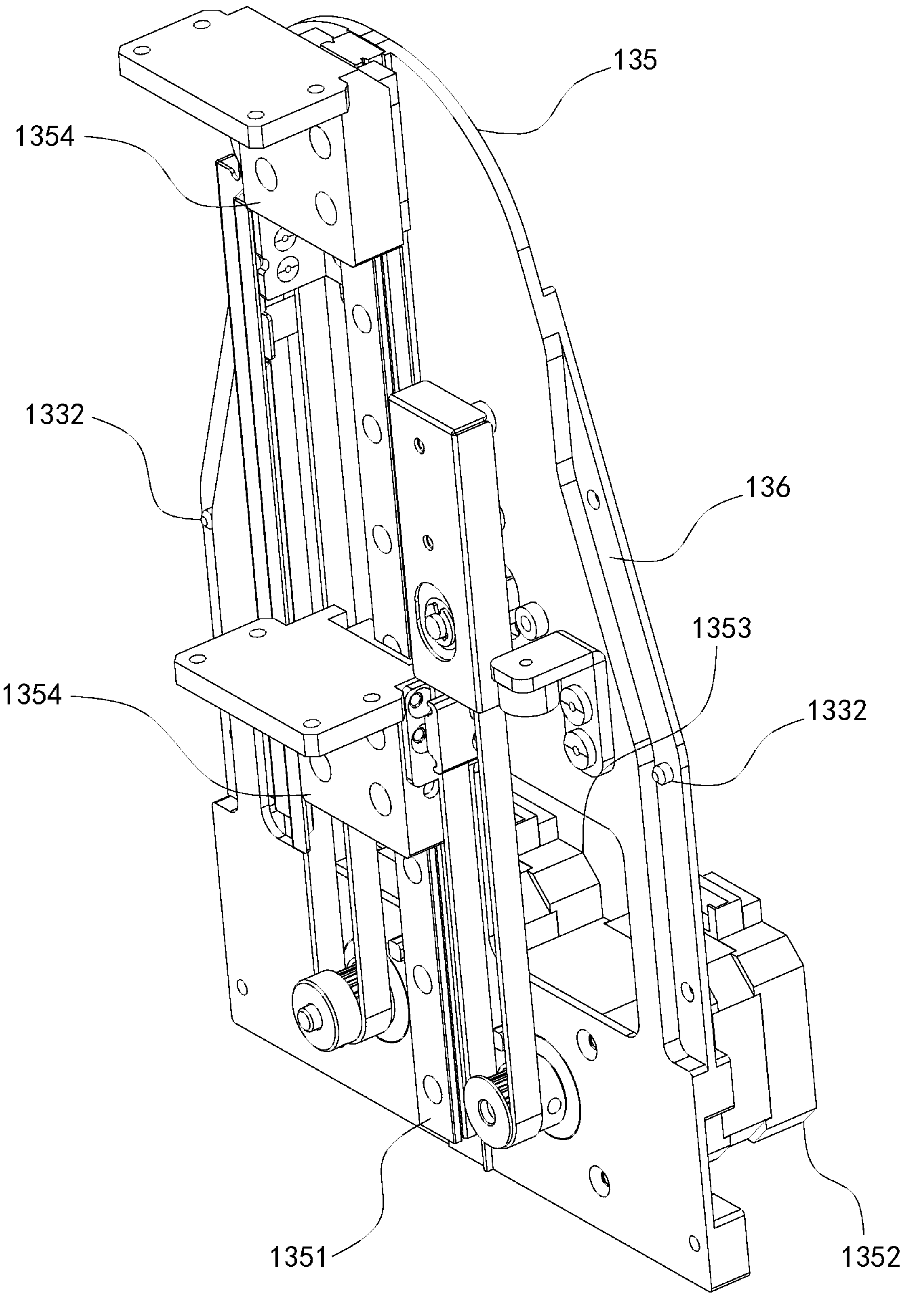
FIG. 4 is a structural view showing the mounting of a second side plate and accessories thereof according to an embodiment of the present invention.

Referring to FIGS. 2, 4 and 5, in a preferable embodiment of the present invention, both sides of the first side plate 134 and the second side plate 135 are respectively connected to one support pillar 133. Particularly, both sides of the first side plate 134 and/or the second side plate 135 are respectively provided with at least one second positioning pin 1332, correspondingly the support pillar 133 is provided with at least one second positioning hole 1333 assembled with the second positioning pin 1332. In such configuration, the first side plate 134 and/or the second side plate 135 reaches to a pre-position for fastening to the support pillar 133 through the second positioning pin 1332 and the corresponding second positioning hole 1333, then the first side plate 134 and/or the second side plate 135 is fastened to the support pillar 133 by locking crews. Therefore, in such easy and convenient way, the first side plate 134 and/or the second side plate 135 can be prepositioned prior to being fastened to the corresponding support pillar 133.

Referring back to FIG. 2, in a preferable embodiment of the present invention, the support pillar 133 is provided with a mounting shoulder 1334 at the connecting portion with the first side plate 134 and/or the second side plate 135. In such case, the second positioning pin 1332 or the second positioning hole 1333 are disposed in the mounting shoulder 1334. In this embodiment, the first side plate 134 and the second side plate 135 can be limited by the mounting shoulder 1334 during mounting and are fastened to the mounting shoulder 1334 through locking screws.

In combination with FIG. 4, in a preferable embodiment of the present invention, both sides of the first side plate 134 and/or the second side plate 135 are respectively provided with a depression 136, so that the mounting shoulder 1334 is correspondingly disposed in the depression 136. Such configuration can further limit the first side plate 134 and/or the second side plate 135 during mounting. It should be noted that in order to adapt for stage light fixture in different specification, the mounting shoulder 1334 has no effect on the change, such as increase or decrease, of the distance between the first side plate 134 and the second side plate 135, when replacing the first side plate 134 and the second side plate 135 with different thickness.

Referring back to FIG. 1, in a preferable embodiment of the present invention, the light head 100 is further provided with an effect assembly holder 160 for mounting an effect assembly 163, at the side of the lens holder 130 away from the light-outgoing lens assembly 120. In particular, the effect assembly holder 160 has two opposite side support plates 161, which are respectively disposed at the same side with the first side plate 134 and the second side plate 135. In this embodiment, the effect assembly 163 is supported by the effect assembly holder 160 to switch in and out of the light path emitted by the light source 110. It should be noted that although only one effect assembly 163 is included in this embodiment, a plurality of effect assemblies 163 can be arranged in the light head in other embodiments according to actual demands.

Preferably, the effect assembly 163 includes one or more of a light shaping element able to change the shape of edge of the light spot projected by the light fixture, a pattern wheel making the light spot with abundant pattern effects, a color wheel for changing the color of the light spot, a fire wheel making the light spot with dynamic effects, and a CMY color mixing element making the light spot with various color. In such embodiment, the light beams emitted from the light source 110 thus can form a variety of light effects when passing through the effect assembly 163 in free combination of the above elements.

Figure 3:
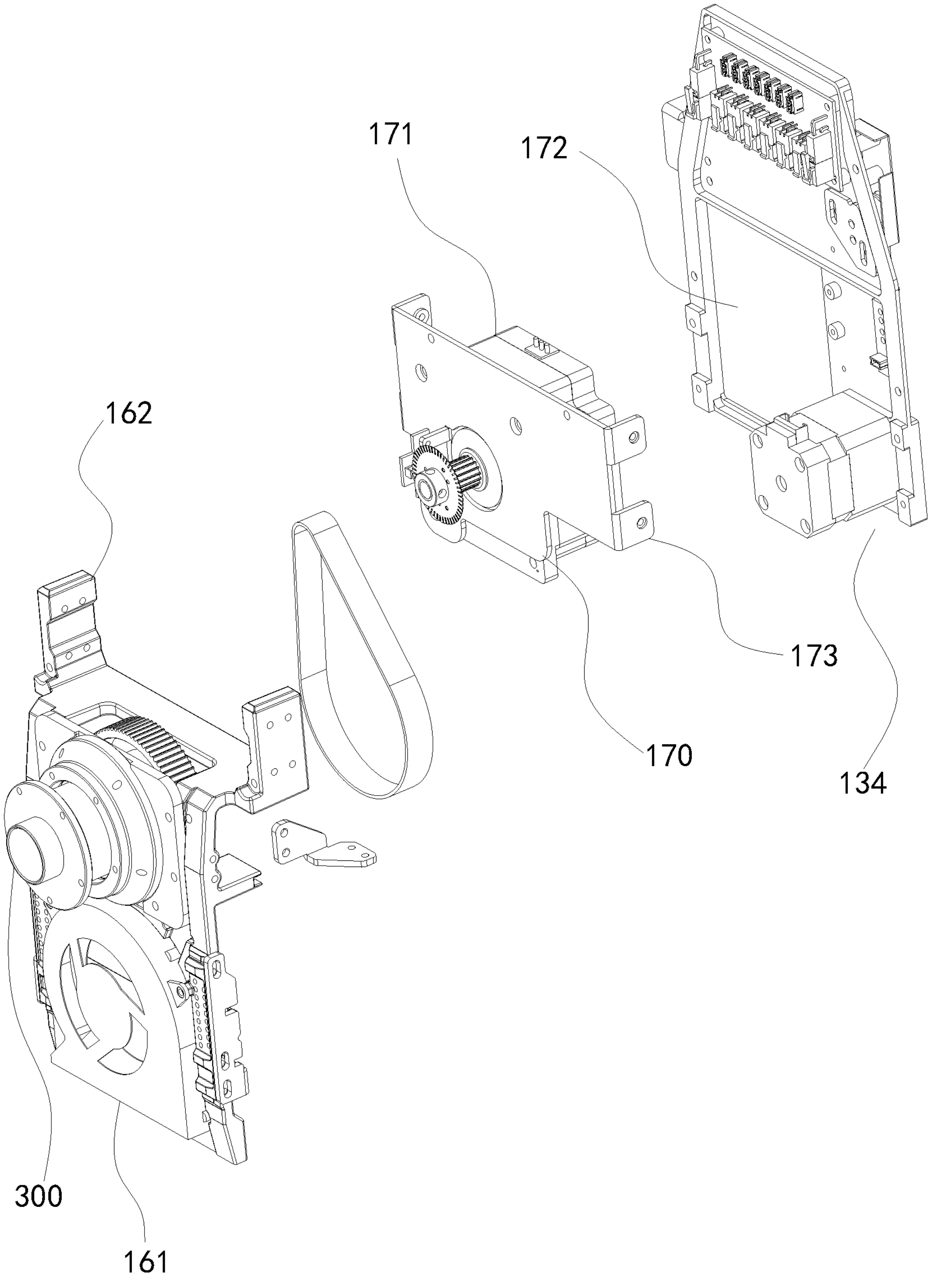
FIG. 3 is a structural view of a first side plate and a side support plate according to an embodiment of the present invention.

In combination with FIG. 3, preferably, the effect assembly holder 160, at the end close to the lens holder 130, extends to form a connecting portion 162 connecting to the support pillar 133. In particular, both sides of the end of the effect assembly holder 160 extends to form a connecting portion 162, so that the effect assembly holder 160 is fastened to the lens holder 130 via the connecting portion 162.

Referring back to FIG. 1, more preferably, the light holder 100 is further provided with a heat dissipator 180, which is disposed at the side thereof away from the light-outgoing lens assembly 120, and the light source 110 is disposed above the heat dissipator 180.

With reference to FIG. 3, in a preferable embodiment of the present invention, the effect assembly holder 160 is pivoted with the support arm 200 via a pivoting shaft 300. In such configuration, the support arm 200 can support the light head 100 to rotate around the pivoting shaft 300.

In a preferable embodiment of the present invention, a motor mounting plate 170 for mounting a drive motor 171 is disposed at the side of the first side plate 134 away from the second side plate 135. Correspondingly, the first side plate 134 is provided with an avoiding hole 172 for avoiding the drive motor 171. The motor mounting plate 170 is also fastened to the support pillar 133. In this embodiment, the drive motor 171 is connected to the pivoting shaft 300 via a transmission belt to drive the light head 100 to rotate around the pivoting shaft 300. In particular, both sides of the motor mounting plate 170 are bended to form a connecting portion 173 towards the lens holder 130, so that the motor mounting plate 170 is fastened to the support pillar 133 via the connecting portion 173.

In combination with FIG. 1 and FIG. 4, in a preferable embodiment of the present invention, a slide rail 1351, especially a vertical slide rail, is disposed at the side of the second side plate 135 close to the first side plate 134, and a first drive motor 1352 and/or a second drive motor 1353 are disposed at the side of the second side plate 135 away from the first side plate 134 for respectively driving the focusing assembly 140 and/or the amplifying assembly 150 to move up and down along the slide rail 1351. In particular, the slide rail 1351 has a side block 1354 which is capable of moving up and down along the slide rail 1351, and the focusing assembly 140 and the amplifying assembly 150 are disposed on the side block 1354. With such configuration, the focusing assembly 140 and/or the amplifying assembly 150 can be moved up and down along the light path emitted from the light source 110 via the side block 1354 and the slide rail 1351, resulting in further varied light effects of the stage light fixture according to actual demands.

Figure 7:
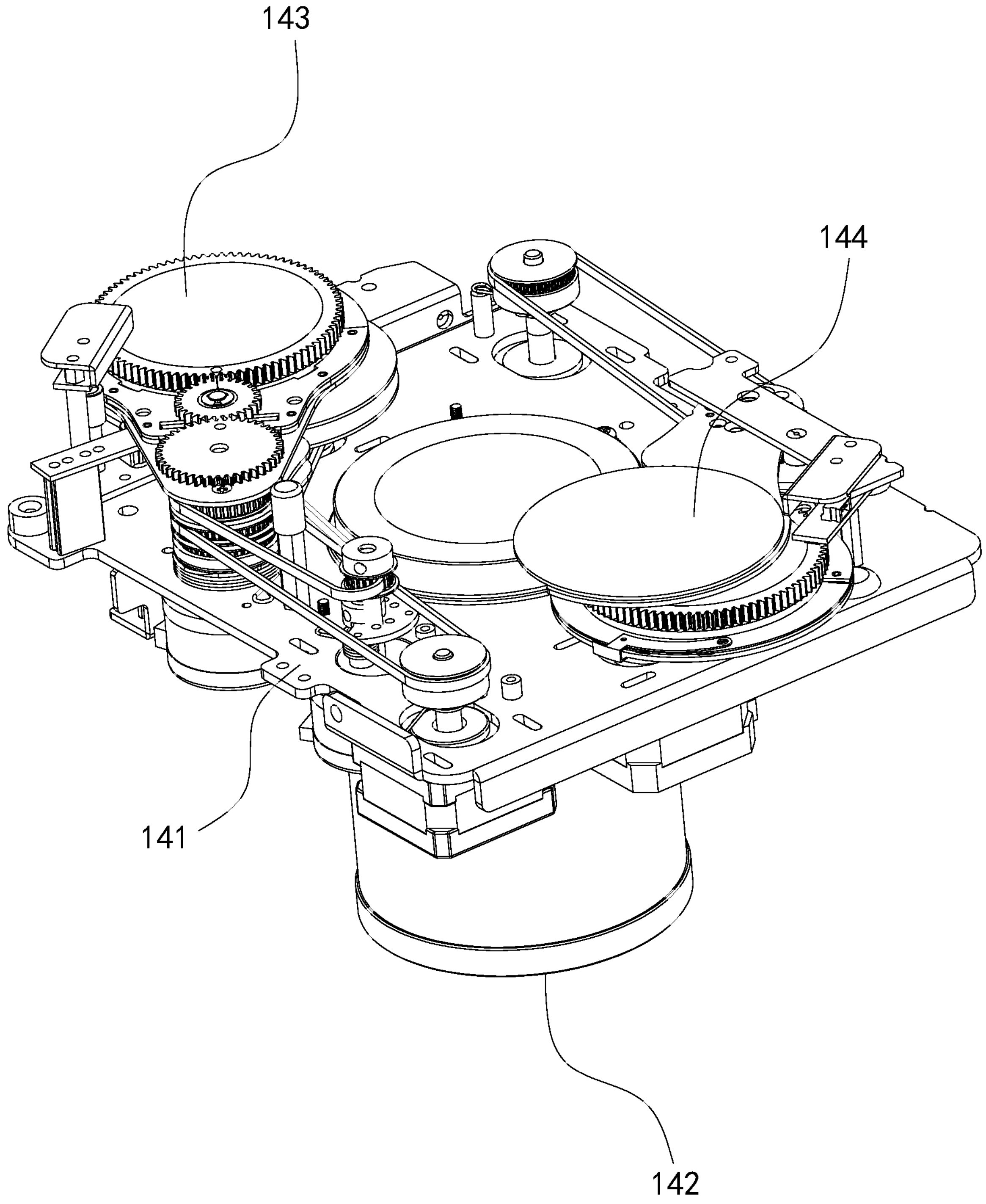
FIG. 7 is a structural view of a focusing assembly according to an embodiment of the present invention.

With reference to FIG. 7, in a preferable embodiment of the present invention, the focusing assembly 140 includes a focusing base plate 141 and a focusing lens 142 thereon. A prism 143 and/or frosting lens 144 are further provided on the focusing base plate 141 for switching in/out of the light path of the focusing lens 142. The focusing lens 142 is able to adjust the focal distance of the light beam emitted from the light source 110 to make the light beam having clear effect regardless of the projected distance. The prism 143 is configured to increase the amount of the light beam of the light source 110. The frosting lens 144 is configured to make the light beam of the light source 110 producing hazy visual effects.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A stage light fixture with an integrated lens holder, comprising:

a light head having a light source and a light-outgoing lens assembly, light emitted from the light source being projected through the light-outgoing lens assembly; and a support arm for supporting the light head to rotate, wherein the light head is provided with a lens mounting ring for fastening the light-outgoing lens assembly, a support plate having a light-passing hole, and a plurality of support pillars for connecting the lens mounting ring to the support plate, such lens mounting ring, support plate, and support pillars integrally form the lens holder in an integrated form to accommodate a focusing assembly and/or an amplifying assembly.

2. The stage light fixture according to claim 1, wherein at least one of the support pillars is provided with a lightening hole at an end close to the lens mounting ring.

3. The stage light fixture according to claim 1, wherein a cross section of at least one of the support pillars at an end close to the support plate is in L shape in a direction perpendicular to a direction of light outgoing.

4. The stage light fixture according to claim 1, wherein the lens mounting ring is provided with at least one first positioning pin for positioning the light-outgoing lens assembly during mounting, and the at least one first positioning pin is disposed at outside of the light-outgoing lens assembly.

5. The stage light fixture according to claim 1, wherein the lens holder is integrally molded by casting.

6. The stage light fixture according to claim 1, wherein the lens holder is detachably disposed with a first side plate and a second side plate which are respectively arranged at two opposite sides of the lens holder.

7. The stage light fixture according to claim 6, wherein both sides of the first side plate and/or the second side plate are respectively connected to one of the support pillars, and both sides of the first side plate and/or the second side plate are respectively provided with at least one second positioning pin, the one of the support pillars is correspondingly provided with at least one second positioning hole assembled with the second positioning pin; or both sides of the first side plate and/or the second side plate are respectively provided with at least one second positioning hole, the one of the support pillars is correspondingly provided with at least one second positioning pin assembled with the second positioning hole.

8. The stage light fixture according to claim 7, wherein at lest one of the support pillars is provided with a mounting shoulder at a connecting portion with the first side plate and/or the second side plate, and the second positioning pin or the second positioning hole are disposed in the mounting shoulder.

9. The stage light fixture according to claim 8, wherein both sides of the first side plate and/or the second side plate are respectively provided with a depression, and the mounting shoulder is correspondingly disposed in the depression.

10. The stage light fixture according to claim 6, further comprising at a side of the lens holder away from the light-outgoing lens assembly, an effect assembly holder for mounting at least one effect assembly, wherein the effect assembly holder has two opposite side support plates which are respectively disposed at the same side with the first side plate and the second side plate.

11. The stage light fixture according to claim 10, wherein the effect assembly holder is pivoted with the support arm via a pivoting shaft.

12. The stage light fixture according to claim 6, wherein a motor mounting plate for mounting a drive motor is disposed at a side of the first side plate away from the second side plate, the first side plate is correspondingly provided with an avoiding hole for avoiding the drive motor, and the motor mounting plate is fastened to the support pillars.

13. The stage light fixture according to claim 6, wherein a slide rail is disposed at a side of the second side plate close to the first side plate, and a first drive motor and/or a second drive motor are disposed at a side of the second side plate away from the first side plate for respectively driving the focusing assembly and/or the amplifying assembly to move up and down along the slide rail.

14. The stage light fixture according to claim 1, wherein the focusing assembly includes a focusing base plate and a focusing lens thereon, and a prism and/or frosting lens are further provided on the focusing base plate for switching in/out of the light path of the focusing lens.

* * * * *